United States Patent [19]
Barrentine

[11] 4,226,211
[45] Oct. 7, 1980

[54] EGG COLLECTOR

[75] Inventor: Earl Barrentine, Bogart, Ga.

[73] Assignee: Chore-Time Equipment, Inc., Milford, Ind.

[21] Appl. No.: 885,122

[22] Filed: Mar. 10, 1978

[51] Int. Cl.² .............................................. A01K 31/16
[52] U.S. Cl. ...................................... 119/48; 198/579
[58] Field of Search ..................... 119/48, 47; 198/460, 198/579, 461

[56] References Cited

U.S. PATENT DOCUMENTS

| | | | |
|---|---|---|---|
| 2,264,156 | 11/1941 | Apple | 119/48 |
| 2,710,682 | 6/1955 | Coll | 119/48 X |
| 2,973,742 | 3/1961 | Kaegebein | 119/48 |
| 3,552,537 | 1/1971 | Vamvakas | 198/579 |
| 4,159,696 | 7/1979 | Martin | 119/48 |

FOREIGN PATENT DOCUMENTS

| | | | |
|---|---|---|---|
| 2101020 | 7/1972 | Fed. Rep. of Germany | 119/48 |
| 2123982 | 11/1972 | Fed. Rep. of Germany | 119/48 |

Primary Examiner—Hugh R. Chamblee
Attorney, Agent, or Firm—Trexler, Wolters, Bushnell & Fosse, Ltd.

[57] ABSTRACT

Apparatus for collecting eggs from a number of poultry cages is disclosed. The apparatus includes a collector conveyor belt for receiving the eggs from egg cages, and a ramp conveyor belt for de-escalating the eggs from the collector conveyor. The cage bottoms are extended to provide a trough in which the collector conveyor belt is carried. Opposite the cages, strips of low-friction material act as bumpers to maintain without damage eggs upon the collector conveyor. A diagonal fence is provided above the collector-ramp belt conveyor junction point to encourage easy, undamaged egg transfer action from the collector to the ramp conveyor. Resilient fingers mounted in rows upon the ramp conveyor encourage undamaged egg de-escalation. An accumulator belt conveyor receives the eggs from the ramp conveyor and carries the eggs to an accumulation point.

23 Claims, 11 Drawing Figures

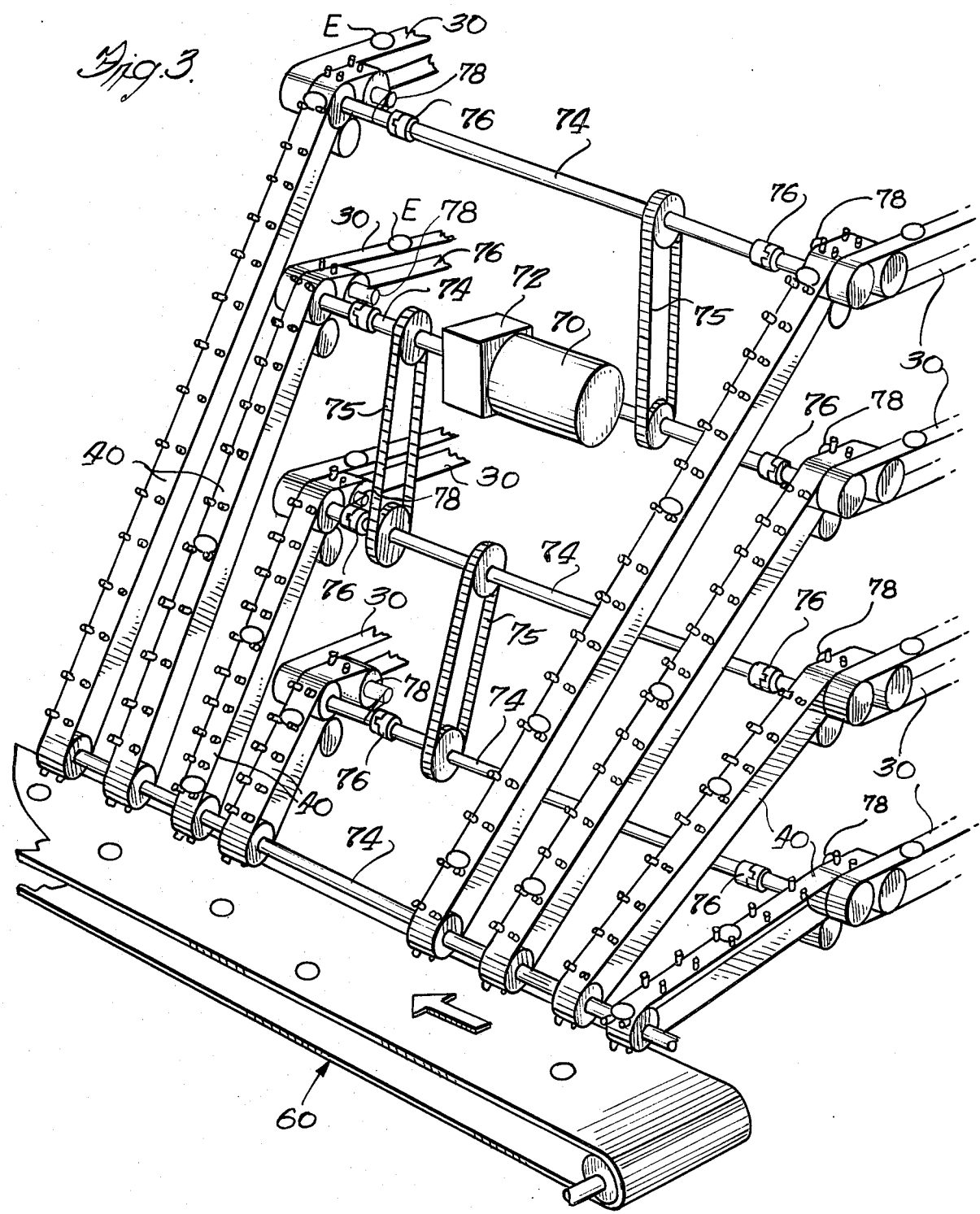

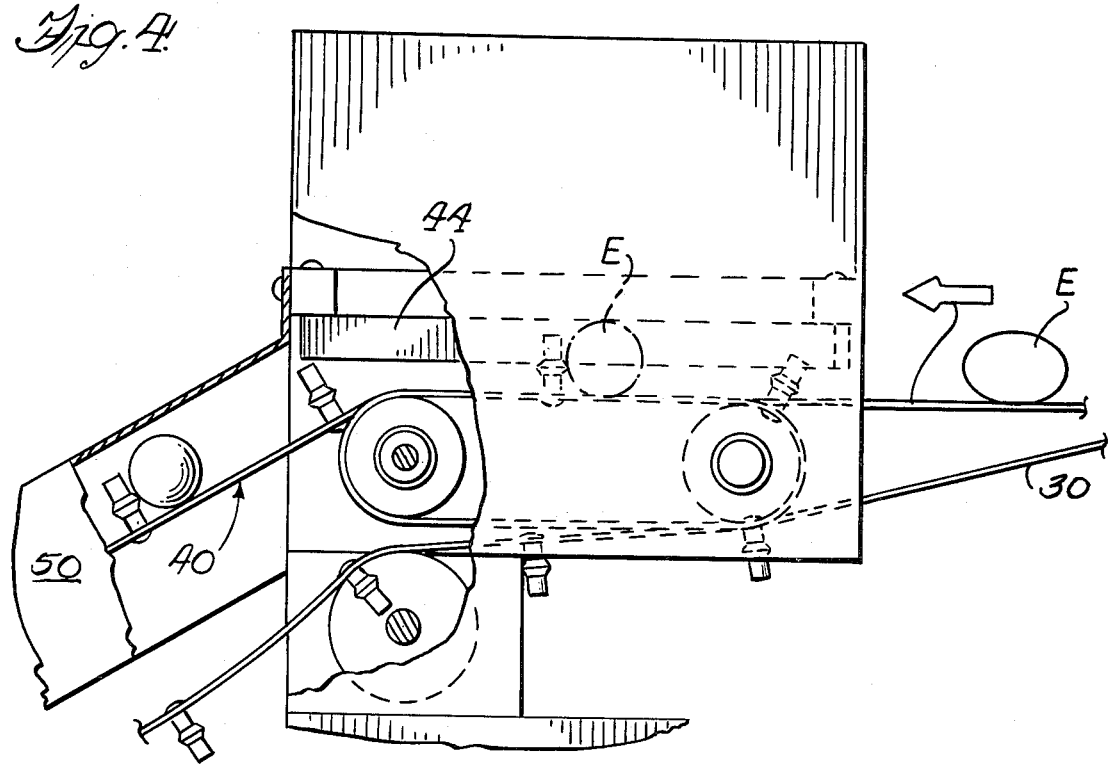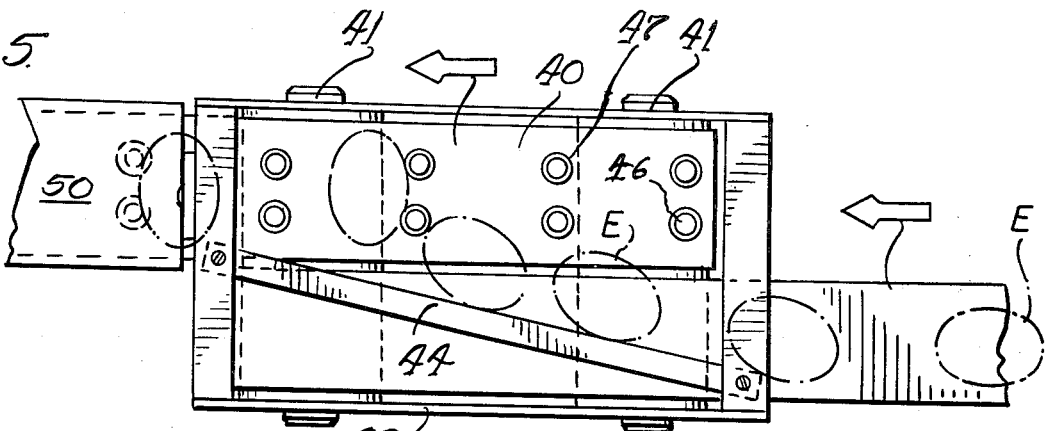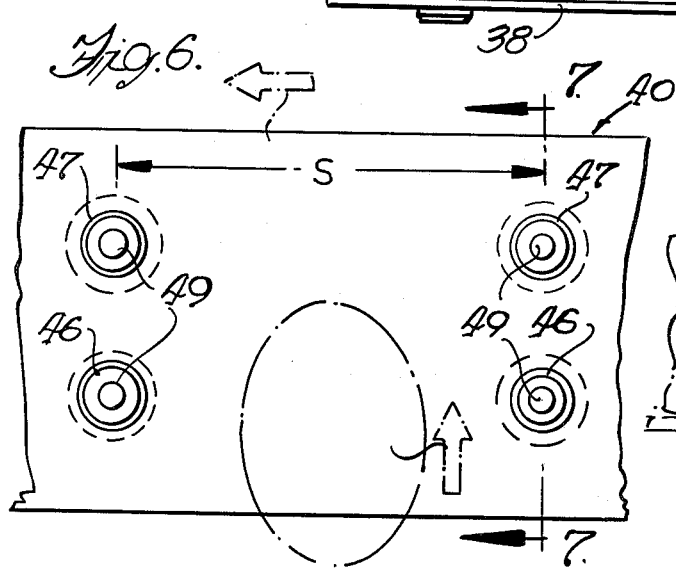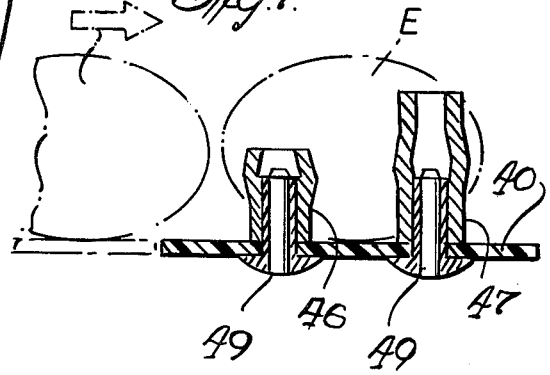

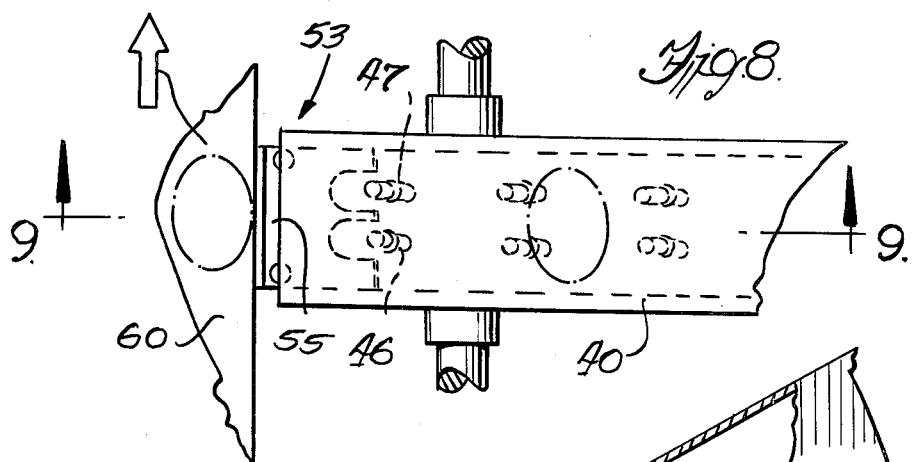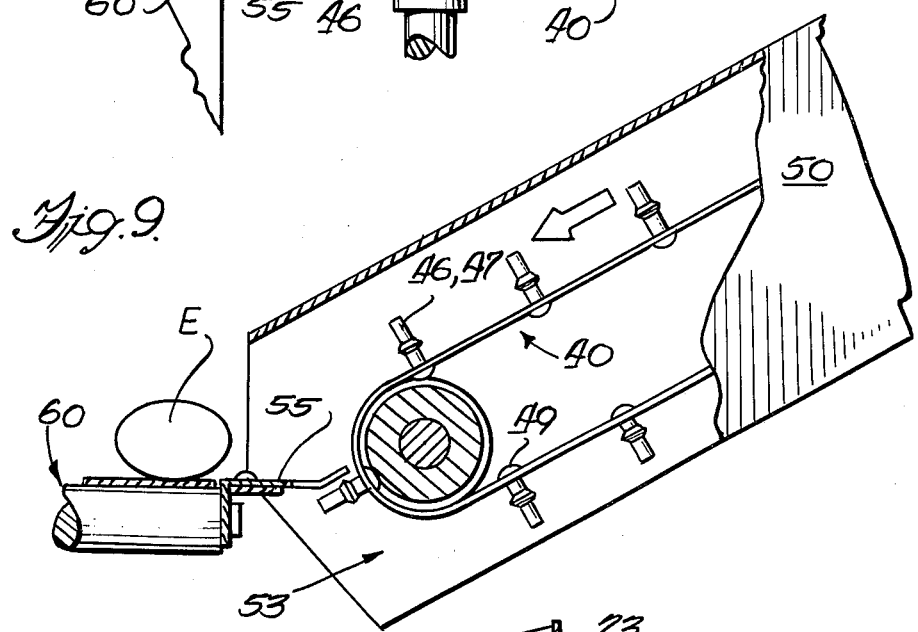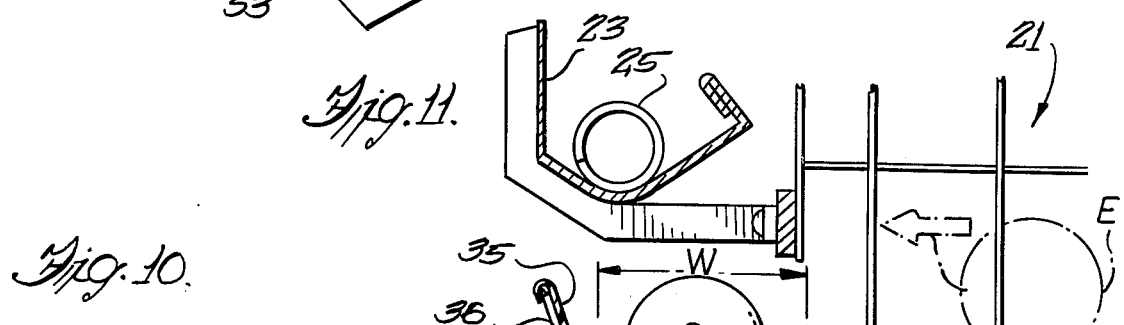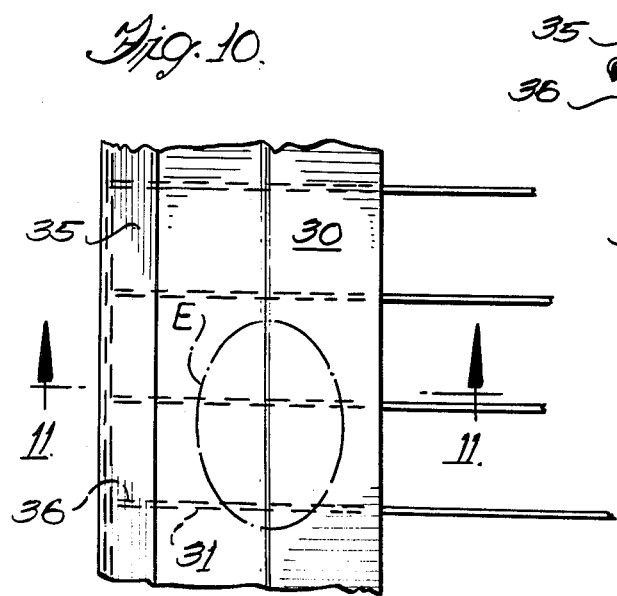

EGG COLLECTOR

BACKGROUND OF THE INVENTION

This invention relates generally to collecting apparatus, and more particularly concerns apparatus for collecting eggs from an array of poultry cages.

Modern poultry operations make extensive use of carefully designed equipment to care for large poultry flocks. For example, thousands of laying hens can be accommodated in specially designed cages where they are provided with food, water, light, air and heat by automatic apparatus. (Typical flocks can contain 30,000 to 85,000 hens.) This apparatus can be controlled or cycled so as to encourage the hens to maximize egg production. In such installations, automatic egg collecting apparatus can serve to further reduce the effort and labor costs of the poultry husbandman. In general, mechanical egg collecting devices are designed to collect the eggs from each poultry cage and to transport those eggs to a centralized packaging or processing station.

Some such egg collecting devices have, in the past, been prone to clogging and befoulment by feathers, spilled feed, or waste material from the hens. Other devices have provided only relatively rough handling to the eggs. Under either set of circumstances, egg breakage can occur, resulting in loss of the broken eggs, possible further befoulment of the collecting apparatus and, in any event, reduction of profit to the poultry husbandman.

It is accordingly the general object of the present invention to provide an egg collecting apparatus which will overcome these difficulties, and which can be offered at a commercially attractive price.

More specifically, it is an object of the present invention which will collect and transport eggs safely and efficiently from laying cages to a centralized collecting and processing station.

Another object is to provide such apparatus which will provide relatively long, trouble-free service life and which can be repaired relatively easily and with minimal expense.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 3 is a fragmentary perspective view similar to FIG. 1 but showing, in further detail, the egg collecting apparatus egg transport belts and associated drive mechanisms;

FIG. 4 is a fragmentary side elevational view similar to FIG. 2 showing in further detail the junction of the egg collector belt and ramp belt;

FIG. 5 is a fragmentary top plan view of the apparatus shown in FIG. 4;

FIG. 6 is a fragmentary top plan view showing in further detail the egg ramp or de-escalator belt;

FIG. 7 is a sectional view taken substantially in the plane of line 7—7 in FIG. 6;

FIG. 8 is a fragmentary top plan view showing the tail or bottom portion of the ramp or de-escalator belt and associated apparatus;

FIG. 9 is a fragmentary sectional view taken substantially in the plane of line 9—9 in FIG. 8;

FIG. 10 is a fragmentary top plan view showing a portion of the cage egg collector ramp, an egg bumper stop and the associated collector belt; and FIG. 11 is a sectional view taken substantially in the plane of line 11—11 in FIG. 10.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention.

Figure 1:
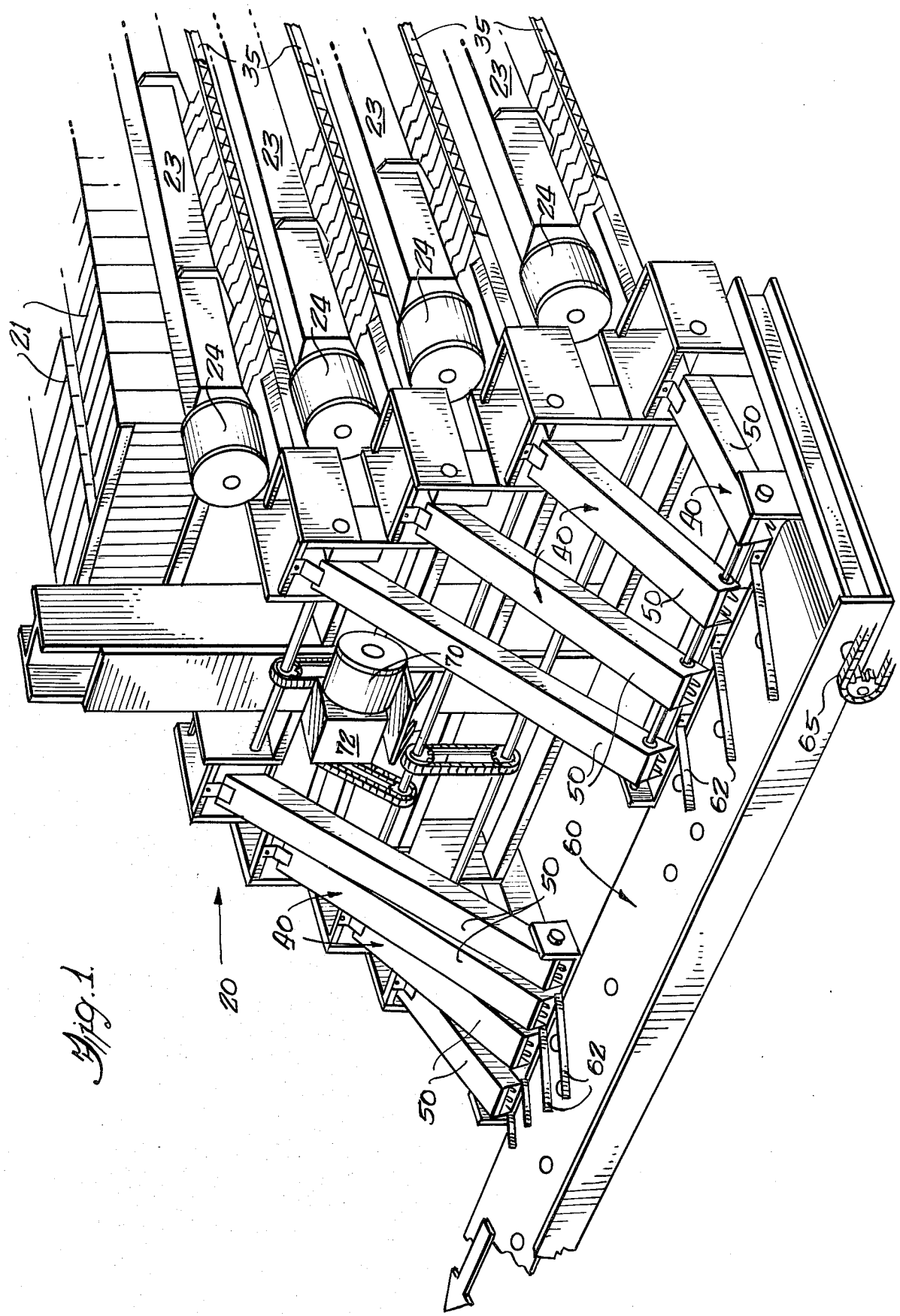
FIG. 1 is a fragmentary perspective view showing the novel egg collecting apparatus in its general aspect.
Figure 2:
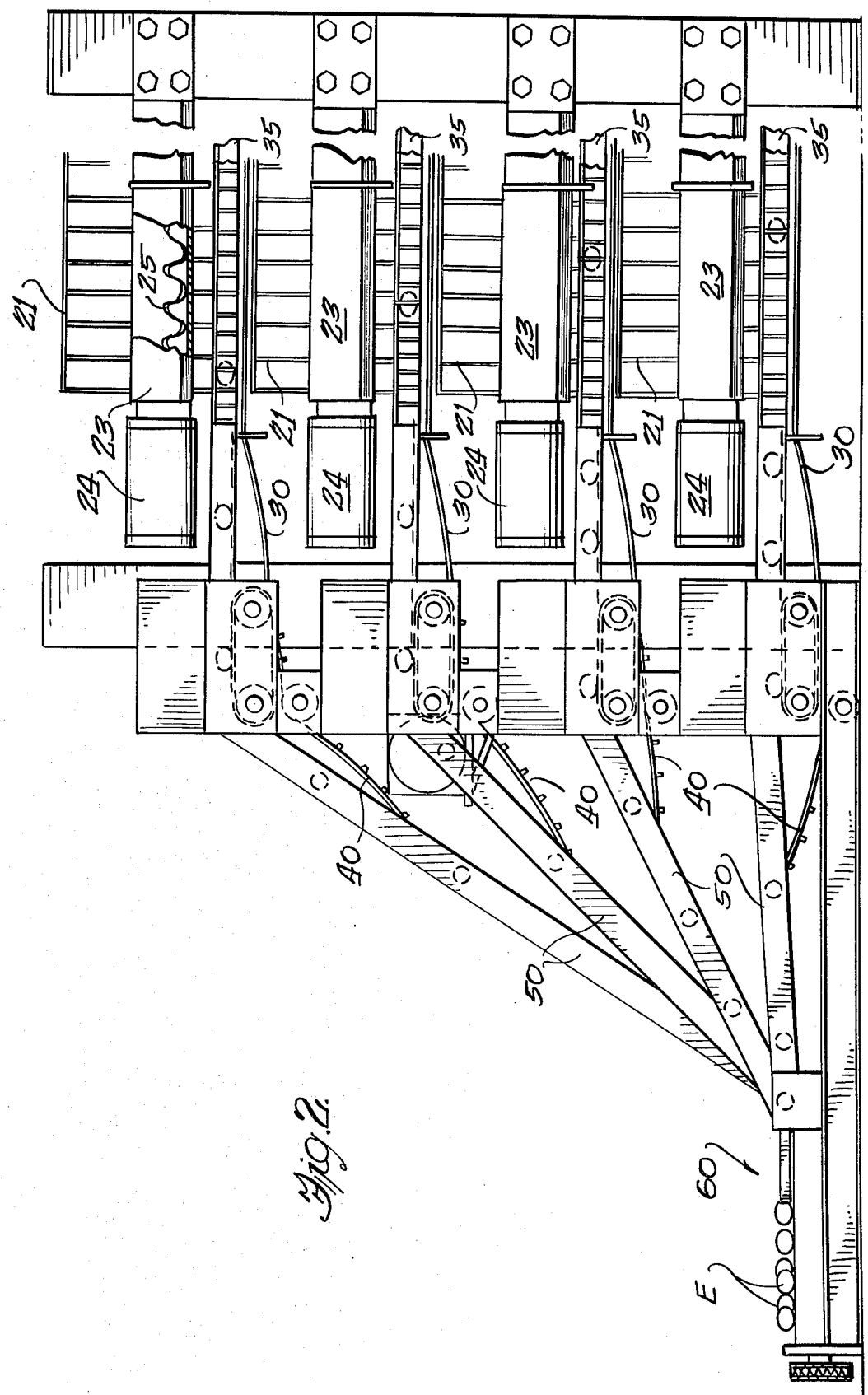
FIG. 2 is a fragmentary side elevational view of the apparatus shown in FIG. 1.

Turning first to FIG. 1, there is shown the novel egg collecting apparatus 20 of the present invention as it appears when associated with a number of poultry-containing cages 21. As illustrated here, these poultry cages 21 are arrayed in a stepped-back elevational or pyramid formation, and can extend for a considerable distance through the interior of a poultry house (not shown). At the lower front perimeter of these cages, feeder troughs 23 offer feed to the caged poultry. Motors 24 or like devices drive conveyor elements such as centerless augers 25 (FIG. 2) so as to urge feed along troughs 23 in a manner which will provide a closely controlled diet to the caged hens, thereby encouraging a maximized egg production from the flock. As can be seen most particularly in FIGS. 10 and 11, these cages 21 are provided with inclined wire mesh bottoms 27 upon which the eggs E are laid and down which the eggs E roll as indicated by the arrow.

It is a feature of the invention that construction and operation cost of the egg collector is minimized. To this end, a collector belt device 30 is carried in a trough 31 formed by extensions 32 of the wire mesh cage bottom elements 27. No expensive separate structure is required to support and align the collector belt 30 with the cages 21. Moreover, this belt 30 is but the width of a single egg; that is, this belt is designed to avoid accommodating two eggs in side-by-side relation upon the belt. Egg breakage is thus minimized. When the apparatus is constructed as described here, the belt can be of a smaller width W (FIG. 11) than in some, if not all, other egg collectors, and the wire extensions 31 can also be reduced in size, thereby reducing the cost of the belt and the amount of cage wire required. These reductions lower, in turn, the completed or offered cost of the egg collecting apparatus 20.

Pursuant to another feature of the invention, the eggs E are introduced to and retained upon the belt 30 with minimal egg-belt impact, and are urged to follow the motion of the belt 30 with minimal likelihood of hangup, thereby minimizing the likelihood that following eggs will collide and be exposed to damage. This is accomplished by continuous bumper strips 35 carried inwardly of fingers 36 formed as extensions of the belt-supporting trough members 31, as shown in FIGS. 10 and 11. As shown particularly in FIG. 10, these strips 35, being continuous in their extent, inhibit any egg E from engaging an individual finger 36 and being restrained thereby. No expensive horizontal wires need be attached to the fingers 36. The strips 35 also act as cushions to inhibit egg damage as the eggs roll out of the cages 21 and on to the collecting device 30. As the eggs are transported by the belt device 30, they are normally carried in a more or less centered position on the conveyor. This carrying position is encouraged by forming the belt-supporting wire extensions with a shallow V-like shape (FIG. 11).

The eggs collected from each individual row of poultry cages by each individual collecting belt device 30 are brought to respective collector belt tails 38, where they are transferred to the head ends of associated ramp or de-escalator belts devices 40. In accordance with another aspect of the invention, this transfer of eggs from the collector belt device 30 to the de-escalator belt device 40 is accomplished with minimal likelihood of damage to the eggs E, yet permits the belts to undergo a self-cleaning action. To this end, as shown particularly in FIGS. 4 and 5, the ramp belt device 40 is provided with guide rollers 41 so as to locate the ramp belt head end 42 adjacent, parallel to and co-planar with the tail end 38 of the collector belt device 30. To discourage egg pile-up at the collector-de-escalator transfer point, the de-escalator belt 40 is driven, by conventional belt drive mechanisms at a belt speed about twice as fast as belt 30. A guide fence 44, diagonally disposed across the tail end 38 of the guide belt device 30, gently and gradually urges the eggs E from the guide belt 30 to the head end 42 of the de-escalator belt device 40. It will be noted, however, that the fence 44 is located at a relatively elevated position above the collector belt tail end 38, as illustrated particularly in FIG. 4. The space between the belts 30 and 40 and the fence 44 permits feathers, excrement and other corruption to be transported under the fence 44 and to be discharged from the belt device 30, thereby providing a self-cleaning action and discouraging collector damage. It will be noted that the ramp belt device 40, like the collector belt device 30, is of a width on the order of two and one-half inches, to accommodate but a single egg over any given belt length and further discourage egg-to-egg contact.

To safely de-escalate or lower the eggs from the elevated collector belt 30 in carrying out the invention, each ramp belt device 40 is provided with a series of resilient fingers 46 and 47 carried in rows in side-by-side relationship. In the illustrated embodiment, relatively short finger 46 is arrayed so as to be located adjacent the collector belt mechanism 30 when the finger 46 is at the ramp belt head end 42 to encourage easy egg transfer from the collector belt mechanism 30 to the ramp de-escalator belt mechanism 40. A relatively tall finger 47 is carried opposite the short finger 46 to provide additional support to the egg E, as most particularly illustrated in FIGS. 5-7. In carrying out the invention, these fingers 46 and 47, which can be formed of suitable resinous flexible plastic or other resilient material, can be mounted to the belt 40 with drive rivets 49 which require no special tools for insertion and application.

To further encourage safe egg handling, the finger rows can be spaced apart by a distance S on the order of 1.1 to 1.5 times the width of a typical egg. A distance of 1.25 times the egg width has been found helpful. Here, the distance S is on the order of 2⅝ inches. This spacing permits easy egg transfer into the spaces or pockets formed between the adjacent finger rows, yet inhibits excessive egg rolling and motion which could lead to egg damage or breakage. To yet further assist in egg handling, a ramp cover or shroud 50 is provided so as to encourage egg retention upon the ramp belt 40.

Eggs de-escalated or lowered by the ramp device 40 reach the ramp device tail end 53 shown particularly in FIGS. 8 and 9. Here, fork extension members 55 receive and cradle the eggs E and transfer the eggs from the ramp device 40 to an accumulator conveyor device 60 for ultimate transfer to the ultimate egg collecting or other processing point (not shown).

To further discourage egg-to-egg collision and consequent damage, inclined fences 62 are provided to encourage the eggs delivered by each ramp conveyor device 40 to be carried upon a somewhat separated width of the belt 60 (FIG. 1). Thus, each egg delivered to the belt 60 is discouraged from encountering and damaging other eggs delivered by other, downstream ramp devices 40. The accumulator conveyor 60 can be driven by a chain drive 65 or other convenient means.

In further accordance with the invention, an inexpensive, unitized drive train is provided, but each ramp belt device 40 and its associated collector belt device 30 can be disengaged from remaining portions of the drive system for repair or maintenance without halting other conveyor operations. As shown in FIG. 3, the drive system includes a power device such as a motor 70 which can be mounted in an integral unit with a transmission or speed-reducing device 72. Shafts 74 and drive chains or belts 75 transfer motive power to the various belts. Each drive shaft 74 is provided, adjacent to associated ramp belt device 40 and collector belt device 30, with a quick-disconnect coupling 76.

Conventional speed-changing devices 78 drive the collector conveyors 30 at substantially one-half the speed of the ramp conveyors 40. That is, the ramp conveyors 40 are driven substantially twice as fast as the collector conveyors 30 to permit easy, nondamaging egg transfer from the collector conveyor to the ramp conveyor, as noted above.

The invention is claimed as follows:

1. Apparatus for collecting eggs from a number of poultry cages, the cages including means for urging any eggs laid in the cage to a cage collecting location, the apparatus including first collector conveyor means for receiving the eggs at each cage egg collecting point, and having a tail end, ramp conveyor means for receiving the eggs from the first collector conveyor means, and having a head end, the collector conveyor means tail end and the ramp conveyor means head end being located in adjacent, parallel, co-planar positions, deflector means for urging the eggs from the collector conveyor to the ramp conveyor means, finger means including a short finger and a long finger mounted side-by-side in a row upon said ramp collector means to permit easy egg acquisition and safe egg retention on the ramp conveyor means out of contact with any other egg during ramp conveyor means operation, drive means for driving the collector conveyor and the ramp conveyor means, the ramp conveyor means being driven substantially twice as fast as the collector conveyor, and accumulator conveyor means for receiving the eggs from the ramp conveyor means and for conveying the eggs to an accumulation point.

2. Egg collecting apparatus for collecting and de-escalating eggs from a row of cages, the apparatus including collector conveyor means for receiving the eggs from the cages, and ramp conveyor means for receiving the eggs from the collector conveyor means, finger means mounted side-by-side in a row upon said ramp collector means to permit easy egg acquisition and safe egg retention on the ramp conveyor means out of contact with any other egg during ramp conveyor means operation, the collecting apparatus further providing deflector means for urging the eggs from the collector conveyor to the ramp conveyor means, conveyor support apparatus for supporting the collector conveyor means tail end and the ramp conveyor means head end in adjacent, parallel, co-planar positions, and drive means for driving the collector conveyor and the ramp conveyor means, the ramp conveyor means being driven substantially twice as fast as the collector conveyor means to permit easy, non-damaging egg transfer from the collector conveyor to the ramp conveyor.

3. Egg collecting apparatus according to claim 2 wherein said deflector means includes fence means extending diagonally over the path of travel of the collector conveyor means and terminating over the ramp conveyor means head end to gradually urge eggs from the collector conveyor means to the ramp conveyor means.

4. Apparatus according to claim 2 wherein said collector conveyor means includes a belt substantially as wide as a single egg.

5. Apparatus according to claim 1 wherein said belt is on the order of two inches wide.

6. Apparatus according to claim 2 wherein said ramp conveyor means includes a belt substantially as wide as a single egg.

7. Apparatus according to claim 6 wherein said belt is on the order of two and one-half inches wide.

8. Apparatus according to claim 6 wherein said conveyor support apparatus includes guide roller means for maintaining that portion of the ramp conveyor belt located at the head end in a substantially horizontal position, and for permitting that portion of the belt leaving the conveyor head end to smoothly assume an inclined position.

9. Apparatus according to claim 6 including means for urging eggs laid in each poultry cage to the poultry cage egg collecting point, said means including conveyor belt support means for carrying the collector conveyor belt, and bumper means opposite the cage to halt and cushion eggs rolling onto the collector conveyor belt from the cages.

10. Apparatus according to claim 9 wherein said conveyor belt support means includes a plurality of upturned fingers on that side of the belt opposite the poultry cages, and wherein said bumper means includes a continuous strip of low-friction material mounted upon said fingers to prevent eggs from rolling off the collector conveyor, and to prevent egg motion on the conveyor from being inhibited by the upturned fingers.

11. Apparatus according to claim 2 wherein said drive means includes power means and disconnect means between the power means and the conveyor means for disconnecting at least one conveyor means from the power means without disturbing the connection between the power means and other conveyor means.

12. Apparatus according to claim 11 wherein said disconnect means is located between said collector conveyor means and said ramp conveyor means on the one hand and said power means on the other hand.

13. Egg collecting apparatus according to claim 2 wherein the ramp receiving head is located at a different height than the ramp conveyor tail end.

14. Apparatus according to claim 13 wherein said ramp conveyor means receiving head is located above said ramp conveyor tail end, the ramp conveyor carrying the eggs downwardly for delivery to the accumulator conveyor means.

15. Apparatus according to claim 2 wherein said ramp conveyor means includes a ramp conveyor belt, the apparatus further including egg motion inhibitor means on the belt for safely lowering the eggs on the ramp conveyor belt to the accumulator means.

16. Apparatus according to claim 15 wherein said inhibitor means includes finger means.

17. Apparatus according to claim 16 wherein said finger means including a short finger and a long finger mounted side-by-side in a row upon said collector belt to permit easy egg acquisition and safe egg retention on the ramp conveyor belt out of contact with any other egg during ramp conveyor means operation.

18. Apparatus according to claim 17 including rivet means mounting the finger means to the belt means.

19. Apparatus according to claim 18 wherein each finger row is spaced apart from the adjacent finger row by a distance of from 1.1 to 1.5 times the length of a typical conveyed egg.

20. Apparatus according to claim 19 wherein said distance between said finger rows is substantially 1.25 times the length of said egg.

21. Apparatus according to claim 16 wherein said ramp conveyor belt means is substantially as wide as a single egg.

22. Apparatus according to claim 21 wherein said ramp conveyor belt means is substantially two and one-half inches wide.

23. Apparatus according to claim 2 including tunnel housing means surrounding said ramp conveyor means for encouraging the eggs to stay on the ramp conveyor means.

* * * * *

UNITED STATES PATENT AND TRADEMARK OFFICE
CERTIFICATE OF CORRECTION

PATENT NO. : 4,226,211
DATED : October 7, 1980
INVENTOR(S) : EARL BARRENTINE

It is certified that error appears in the above—identified patent and that said Letters Patent are hereby corrected as shown below:

Column 4, line 28, change "to" to --each--;

Column 5, line 23, change "according to claim 1" to --according to claim 4--.

Signed and Sealed this

Seventeenth Day of February 1981

[SEAL]

Attest:

RENE D. TEGTMEYER

Attesting Officer    Acting Commissioner of Patents and Trademarks